United States Patent
Bagg

(10) Patent No.: US 9,747,214 B2
(45) Date of Patent: Aug. 29, 2017

(54) FORECAST MODELING CACHE PREFETCH SYSTEM AND METHOD

(71) Applicant: Schwegman Lundberg & Woessner, P.A., Minneapolis, MN (US)

(72) Inventor: Theodore Antibes Ariel Bagg, Minneapolis, MN (US)

(73) Assignee: Schwegman Lundberg & Woessner, P.A., Minneapolis, MN (US)

( * ) Notice: Subject to any disclaimer, the term of this patent is extended or adjusted under 35 U.S.C. 154(b) by 367 days.

(21) Appl. No.: 14/285,302

(22) Filed: May 22, 2014

(65) Prior Publication Data

US 2014/0351188 A1 Nov. 27, 2014

Related U.S. Application Data

(60) Provisional application No. 61/826,370, filed on May 22, 2013.

(51) Int. Cl.
*G06F 12/0862* (2016.01)
*G06N 3/02* (2006.01)

(52) U.S. Cl.
CPC .......... *G06F 12/0862* (2013.01); *G06N 3/02* (2013.01); *G06F 2212/602* (2013.01); *G06F 2212/6024* (2013.01)

(58) Field of Classification Search
None
See application file for complete search history.

(56) References Cited

PUBLICATIONS

Cobb et al., Web proxy cache replacement scheme based on back-propagation neural network, Nov. 1, 2007, The Journal of Sysmtes and Software, 81, pp. 1539-1558.*
Tian et al., An Adaptive Web Cache Access Predictor Using Neural Network, IEA/AIE 2002, LNAI 2358, pp. 450-459.*
Bender, Michael A., et al., "An Adaptive Packed-Memory Array", *ACM Transactions on Computational Logic*, vol. V, No. 5, (Jul. 2007), 1-38.
Ibrahim, Tamer I., et al., "Neural Nets Based Predictive Pre-fetching to Tolerate WWW Latency", *Proceedings 20th IEEE International Conference on Distributed Computing Systems*, (2000), 18 pgs.

* cited by examiner

*Primary Examiner* — Alan Chen
(74) *Attorney, Agent, or Firm* — Schwegman Lundberg & Woessner, P.A.

(57) ABSTRACT

A system and method for prefetching data. Address logs are separated into streams and a model associated with each stream. Each stream address is forecasted according to its respective model and pages corresponding to one or more forecasted stream addresses are retrieved from memory based on their respective models.

14 Claims, 3 Drawing Sheets

FORECAST MODELING CACHE PREFETCH SYSTEM AND METHOD

CLAIM OF PRIORITY

This application claims the benefit of priority under 35 U.S.C. §119(e) of U.S. Provisional Patent Application Ser. No. 61/826,370, entitled "PREFETCH SYSTEM AND METHOD", filed on May 22, 2013, the benefit of priority of which is claimed hereby, and which is incorporated by reference herein in its entirety.

BACKGROUND

A hierarchical memory model balances the need for quick access to data in memory against the cost of memory itself. Data that will probably be used in the near term is kept in fast memory, while data that is not likely to be used in the near term migrates out to big, slow, memory. The efficiency of moving data between fast and slow memory plays a critical part in computer performance. If data that is more likely to be used in the near future is moved from slower memory to faster memory, it will be accessed from fast memory and the computer operates more efficiently. To-date, prefetch algorithms have relied on the principle of locality, moving data stored at addresses close to the addresses of data currently being used by the computer to faster memory.

Artificial neural network programming, genetic programming and wavelet analysis can be usefully combined in a variety of ways. Neural networks can sharpen the selection process in a genetic algorithm, and can themselves be evolved using a genetic algorithm. Basis selection in multiresolution wavelet analysis can be improved using genetic programming to construct the thresholding function.

BRIEF DESCRIPTION OF DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
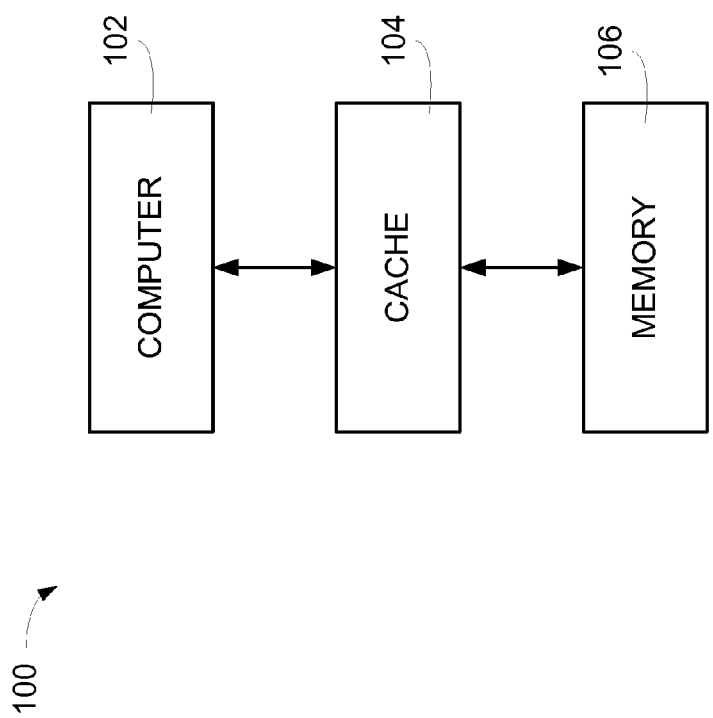
FIG. 1 shows a computer system according to the present invention.

FIG. 1 shows a computer system 100. Computer system 100 includes a computer 102 connected through cache 104 to memory 106. In one embodiment, cache 104 is used to implement a prefetch mechanism which forecasts the set of near-term page address accesses using integer neural nets fed by discrete transforms of the access history. Discrete transform types that can be used include wavelet, cosine and Fourier, finite field variants of all three in particular. In one example embodiment, an asynchronous genetic algorithm trains the nets using time-stamped access logs.

In one embodiment, a procedure evolved using asynchronous genetic programming helps to select bases best adapted to the developing history. Multiple bases and transforms can be used simultaneously to capture enough information about the access pattern to provide an accurate forecast.

Figure 2:
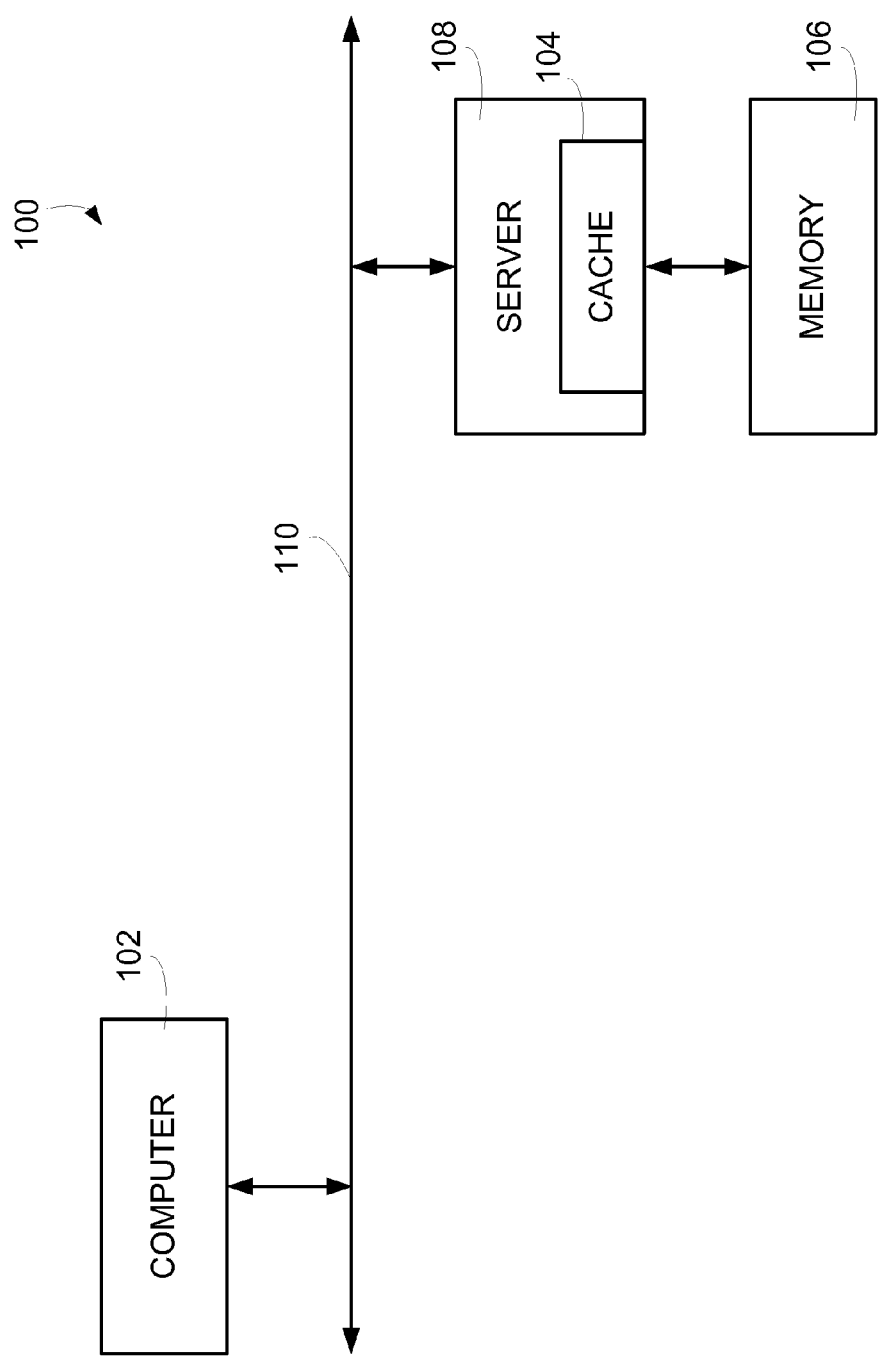
FIG. 2 shows a client-server system according to the present invention.

In one embodiment, as is shown in FIG. 2, cache 104 is implemented as a cache within a server 108. In one such embodiment, server 108 is connected to computer 102 over a network 110. In one such embodiment, server 108 implements server cache management in two parts, 1) a real-time component that runs on the server to predict the pages of served memory that will be accessed soon and that keeps them loaded in physical memory, and 2) a separate application that processes time-stamped access logs to configure and tune the real-time component.

In one embodiment, the real-time component includes three parts: 1) a Hook, 2) a Forecaster and 3) a Fetcher. The Hook is called in the course of handling server memory access requests from the client host 102, to freshen the cache status of the requested page's address. The Forecaster tracks and forecasts accesses expected soon, compiling a set of page addresses forecast but not yet loaded for the Fetcher. The Fetcher loads forecast pages absent from physical memory, evicting and overwriting the stalest resident pages as necessary. The Fetcher also maintains a data structure representing the set of addresses of all pages loaded, partitioned into subsets graded by age since last access.

Figure 3:
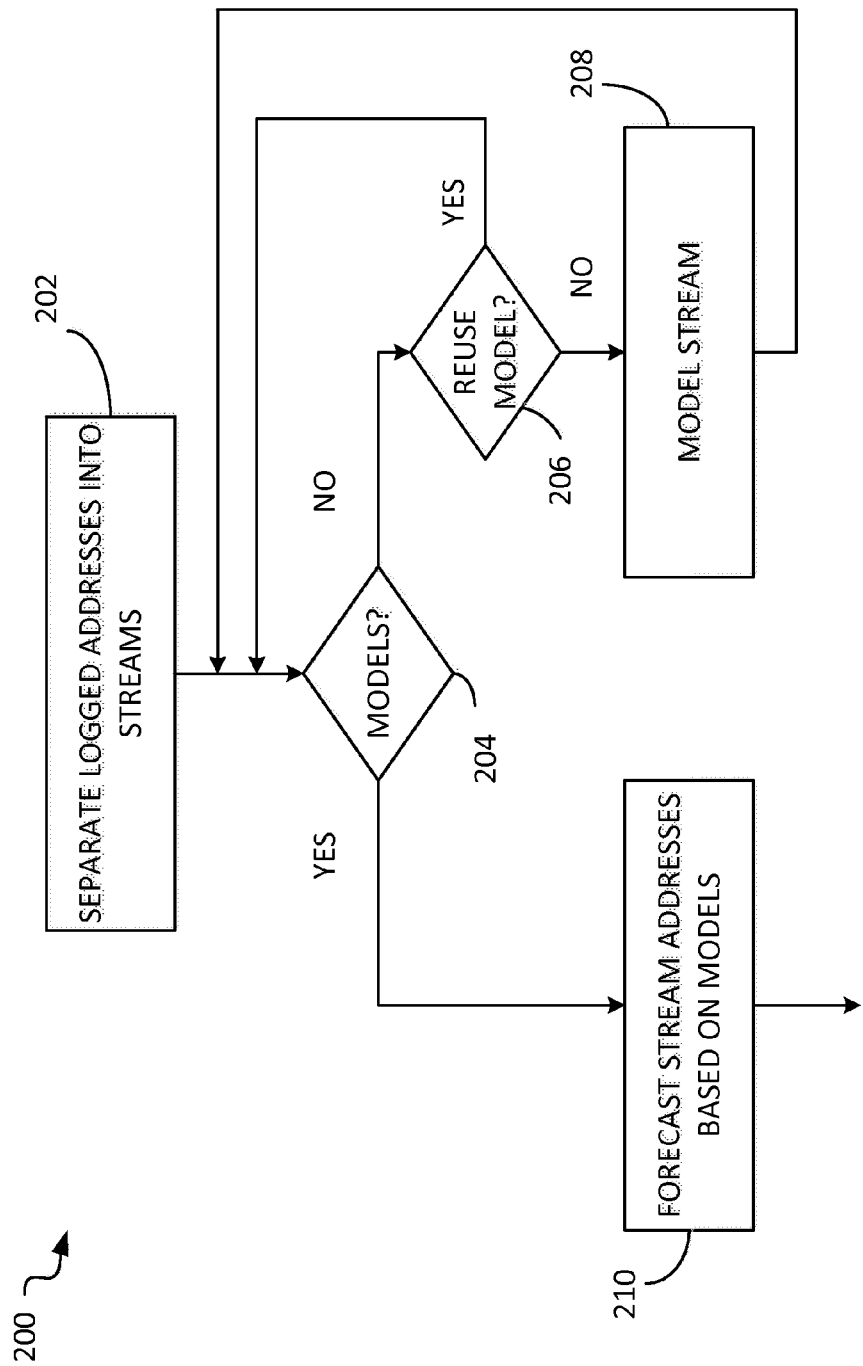
FIG. 3 shows a method of prefetching pages.

We will outline below methods used to implement aspects of these operations. We will describe: (1) Use of an artificial neural network fed by discrete harmonic analysis to forecast memory accesses; (2) An asynchronous genetic algorithm; (3) Use of a graded partial order instead of a totally ordered LRU list to track age in the cache; (4) Use of a cyclic list of sparse packed bit-arrays to manage such a graded set efficiently; (5) use of a singly-linked list to maintain percentile pointers efficiently in parallel with binary tree insertion constrained to monotonic node migration; and (6) a reproduction scheduling procedure for the genetic algorithm that integrates mating with mutated cloning by treating cloning as an individual's pairing with itself and configures the probability of each possible reproductive combination according to sum and difference of fitness ranks A method of prefetching page addresses is shown in FIG. 3. As noted above, we describe a prefetch mechanism which forecasts the set of near-term page address accesses using integer neural nets fed by discrete transforms of the access history. In one example embodiment, an asynchronous genetic algorithm trains the nets using time-stamped access logs.

In one such embodiment, the raw access log pairs time-stamped addresses with requesting client process identifiers (PID's), which, in one embodiment, are integers. In one such embodiment, as is shown in FIG. 3 at 202, the logs are segregated by PID into separate streams of time-stamped addresses, and then each stream is assigned a model. The association with PID's is ephemeral, as are processes themselves; the models persist in files, to be reused with new PID's if they fit, and as a source of initial values for individuals in the genetic algorithm. A given model may be used with several PID's simultaneously.

We assume that the raw log contains no more than one access for each discrete time value. To help correct for congestion among processes seeking to access memory simultaneously, a third integer is attached to each time-stamped page address in a PID's stream, counting the number of accesses by other PID's in the raw log occurring between the value in question and the preceding one for the same PID. These interstitial counts can be used to construct a massaged stream for input to a model, for example by subtracting from each timestamp the product of the corresponding count and a fixed value representing the time required for a single access. But whether the counts are used in this way, some other way, or not at all is a property of the model applied.

A check is made at 204 to determine is if a model has been assigned to each address stream. If so, control moves to 210 and system 100 begins to prefetch pages based on the model. If one or more streams is without a model, control moves to 206 and an appropriate model is selected and assigned.

In one embodiment, models are generated anew for each new stream. This approach can, however, be burdensome, especially when an existing model is close enough. In one embodiment, as is shown in FIG. 3 at 206, before the genetic algorithm is engaged to model a new PID's stream, quick trials are made of saved models to check whether they will work well with the new stream; the stream is run through a model and the model accepted if the forecast is good enough. If so, control moves to 204. In one such embodiment, a default model is applied to unmatched streams until suitable matches are found.

If no existing model can be used at 206, control moves to 208 and a new model is determined as detailed below. Control then moves to 204.

In one embodiment, the address space served consists of all nonnegative integers less than a given integer whose binary logarithm is a certain positive integer N (e.g., 64). This address range is partitioned into ordinally contiguous pages having each the same cardinal whose binary logarithm is a smaller positive integer, so the number of pages has likewise a positive integral binary logarithm, call it P.

In one such embodiment, memory is allocated and served in pages. Address pages that are not in use are not mapped to storage in memory 106, and pages may be allocated without storing information; but once information is stored to a page, it is assigned storage in memory 106, saved there and accessed with the same address until overwritten or the page is freed.

In one embodiment, an aging algorithm is used to determining pages to be replaced in cache. In one such embodiment, a page with information is kept in physical memory in cache 104 until the age-graded subset containing its address is the oldest subset and its space is needed to load a new page either by the Fetcher or because of a cache miss (which should become rare once the Fetcher is trained).

Hook and Fetcher operation will be discussed next.

In one embodiment, we represent the age-graded page-address subset partition using a singly-linked cyclic list of sparse packed bit arrays to represent the member-sets of the graded partition, with fast set difference, address retrieval and insertion algorithms. One implementation of packed arrays is described by Bender & Hu in An Adaptive Packed Memory Array.

In one such approach, the pointer to the list references the head, containing the freshest set. The head links the tail, containing the stalest set. Each successive link in the chain from the tail onward references a fresher set, culminating with the head and completing the cycle.

In one embodiment, the Hook merely adds the page addresses corresponding to the memory access occasioning it to the head set. It ignores the possible presence of the addresses in the older sets, as the search performed with such frequency would waste too much time; these entries are purged as detailed below. In one such embodiment, the Hook is not responsible for actually loading the pages referenced; in such embodiments, this has been or will be done separately.

In one embodiment, the Fetcher processes the new set of absent forecast addresses, likewise represented as a sparse packed bit-array, prepared for it by the Forecaster, in stages.

In one embodiment, the Fetcher prepares to insert a new head set by performing a set subtraction removing all elements of the current head set from each of the other sets, to ensure that no recent accesses in the head are wrongly condemned, not only in this but in future eviction steps. Any sets that are empty after this operation are deleted from the cyclic list. The Fetcher then creates and inserts a new empty head between the tail and the old head. Hook activations occurring before the rest of this operation terminates add their addresses to the new head set.

Next, the Fetcher compares the size of the new set from the Forecaster to the number of free pages in the cache 104. If there's not enough space in the cache, it purges stale pages to make room, using the following procedure: Starting with the tail set, it evicts enough pages to make room, removing the addresses from the tail set as it goes. It deletes the tail from the cyclic list if the tail set is emptied by the foregoing removal, and continues with the new tail if more room is needed.

When there's room in the cache 104, the Fetcher loads the new set by allocating and mapping a physical page (if still absent) for each address it contains, retrieving the corresponding page from memory 106 if it exists, and adding the address to the head set.

Forecaster operation will be discussed next. With each entry to this forecasting routine, the goal is not to forecast precisely the client accesses that occur before the next entry, but instead to ensure that the set loaded into physical memory contains them all.

In one embodiment, a neural net/wavelet based forecasting model is used to construct an integer-valued forecast model from the time-stamped address access logs. In one such embodiment, our algorithm is optimized to forecast, not a single value in the immediate future, but instead a set of values in the near future. The artificial evolutionary fitness criterion used to generate that set of values judges forecasts accordingly by the near-term sets they generate. It punishes cache misses, while preferring the smallest proportion of false alarms. It values parsimony, favoring as few parameters as possible.

In one embodiment, we use integers rather than floating point in the neural net model in the expectation that avoidance of floating-point will save time in this algorithm whose output is a set of integers and which models (as a stochastic process) a random set-endomorphism of a finite field (both discrete time and page address treated as taking values in the $2^N$-element finite field of machine integers).

In one embodiment, our neural nets satisfy the system $$v_i = T\left(\sum_j a_{ij} v_j - b_i\right)$$

where $v_i$ is the $i^{th}$ neuron activation ($v_i$ is not an input, while $v_j$ i may be), $a_{ij}$ the weight given by the $i^{th}$ neuron to the $j^{th}$ neuron's activation, $b_i$ the $i^{th}$ neuron's bias, and $T(x)=1$ when $x \geq 0$ as a 2's-complement integer, and $T(x)=0$ otherwise.

In one embodiment, the neuron activations are partitioned and the members of the partition are totally ordered, with the output set being first, the input set last, and the internal partition members strung between. With respect to this order, we require that the network be feed-forward, the partition members thereby layers: Each $a_{ij}$ can be nonzero only when the partition member containing i precedes the member containing j. If the activations are indexed isotonically with this order (so the partition members form contiguous index ranges), this constrains the weight matrix so that the block row corresponding to each member can have nonzero entries only in the member blocks to the right of its own diagonal-straddling square block. The effect of this constraint is that the outputs can be computed directly from the inputs by applying a sequence of substitutions.

In one such embodiment, we omit the commonly-used additional constraint that connections are allowed only between partition members adjacent in the order above (adjacent layers). Imposing it would further limit the non-zero weights to the blocks immediately to the right of the diagonal blocks.

In one embodiment, the output is an array of P-bit page addresses, some of which may coincide. One possible address value (say all zeroes or maybe ones) is set aside to signify that no address is really meant; so the number of distinct values is a set whose size varies from zero to the size of the array. In one such embodiment, there is one output activation for each of the P bits in an output page address, and one input activation allocated (but not necessarily enabled by the evolved model) for each bit in each discrete transform coefficient.

In one embodiment, the weights have integer ranges instead of being strictly two-valued. In one embodiment, the weight and bias matrices are sparse and are represented as sparse arrays. If the weights are binary, they are also packed.

In one such embodiment, summation of slot-wise products of packed binary arrays are implemented on a Xeon by using an XLAT loop to feed slot-wise product=bitwise ANDed bytes to a 256-byte array that counts the bits, and [M]PSADBW to sum the counts.

In one embodiment, a configuration and tuning application uses a genetic algorithm to produce a crop of top-scoring models which incorporate several distinct types of discrete harmonic analysis. If the top-scoring models are very diverse, (that is, the mean distance, using the city metric, for instance, between any two models in this handful is greater than some threshold value), two may be used to forecast the page address requests over the time interval between entries to this procedure.

In one embodiment, if the mean distance exceeds a larger threshold, three may be used, and so on.

In one embodiment, each predicted address is checked against the page tables in server 108 to determine whether the page already is present in physical memory. If not, it's added to the set of predicted-but-absent addresses mentioned above for use by the Fetch operation.

In some embodiments, it can be useful to use a larger range for neuron activations. In some such embodiments, T(x) is determined as follows (using 2's complement ordering):

$T(x)=2^w-1$ when $M \le x$ $T(x)=u_x$ when $0 \le x < M$, and $T(x)=0$ when $x<0$ where W is a fixed integer between 0 and N, while M and $u: 0 \le u_0 \le \ldots \le u_{M-1} < 2^W$ might be configured or trained. This would let us encode a P-bit page address or a discrete transform coefficient with one or just a few neuron activations rather than P or N of them.

The feedforward neural network architecture described above is one approach; other types of neural networks can be used as well, including radial basis function networks, cascade correlation and hyperspherical classifiers.

The asynchronous genetic algorithm is discussed next. In one embodiment, the genetic algorithm employed is more effective because the individuals are evolved asynchronously, rather than in distinct generations, being treated as a fixed population of competitive slots, each containing at most one individual. Slots progress among a finite set of states and queues, whose service routines determine each slot's subsequent state, and which can be scheduled in parallel.

In one such embodiment, all slots are initially empty, in need of raw initialization. In some such embodiments, a slot is this state is initialized with either an informed guess, based on the relevant discrete transforms of the log-derived stream, or with a random mutation of a saved individual. The choice between the two is made each time with a probability that is a parameter of the genetic algorithm. Once initialized, the slot's state changes to being in need of fitness evaluation. This test is computationally expensive, requiring much more work than computing a hash from the genes, so a hash is kept of every individual to avoid testing any of them more than once, and also to avoid wasting space and time on duplicates. Failing individuals are deleted, their slots queued for immediate replacement by informed guessing or reproduction. In one embodiment, preference between the two options is determined by reviewing the proportions of slots that have been filled or tested.

Reproduction will be discussed next. In one embodiment, an individual's probability of reproduction depends on fitness. In one such embodiment, the breeding pairs are arranged in the upper triangle of a matrix, the main diagonal (the self-pairings) included. The dimensions are sorted by fitness rank, an integer ranging from fittest=1 to the size S of the breeding population. This triangular array is partitioned into cells each containing all pairs whose two fitness ranks sum to the same value. Each such constant-sum partition cell contains just one pairing of an individual with itself.

In one such embodiment, a reproductive decision thread selects a pair based on two uniform random choices from a large range (e.g., 0 to T) of equally-likely possibilities.

In one such embodiment, for each choice, the range is partitioned into S contiguous intervals whose measures relative to the total 0-to-T range are the probabilities configured for the corresponding options. The first choice is among the possible rank sums; the second is among pairs in the triangle whose ranks sum to that value.

If a self-pairing is chosen, the corresponding individual is cloned and the result subjected to a mutation according to a configured range of possibilities. Note that applying mutation only to clones incorporates hill climbing into the algorithm implicitly.

In some embodiments, the total number of bits toggled in each mutation is constrained and the probability of each given bit being affected is constrained as well. If an actual pair is chosen, two new individuals are created by swapping a randomly-chosen subset of corresponding genes.

In one embodiment, we use a singly-linked list to support percentile pointers pointing to individuals whose rank corresponds to that percentile. In one such embodiment, the breeding individuals are stored in a balanced binary tree, such as a red-black tree. In addition to the tree structure, a separate singly-linked list connects each individual to the fitter individual immediately preceding it in the sort. This is worthwhile because each of the several percentile pointers into the list needs to be maintained with every insertion. In a significant fraction of cases, such a percentile pointer needs to be updated by retrieving the immediately preceding individual from the tree. Doing this for several percentiles is more expensive than the single linked-list insertion required to obviate all of these tree retrievals. One only needs one additional link per individual because the fitness at a given rank stays the same or increases, but never decreases, over the course of the calculation.

In one embodiment, genes include parameters of the neural network (e.g., neural net weights and biases in a feedforward neural network) and the basis parameters. For example, when using the discrete wavelet transform, the conjugate mirror filters are part of the genome.

In one embodiment, configurable parameters of the model include the number and type of discrete transforms employed, their various finite lengths/periods, and which possible uses of the interstitial counts to try.

As noted above, the algorithm selects the fittest individuals. In one embodiment, individuals are tested by running the digital transform(s) repeatedly on successive overlapping shifted sections of the log-derived stream, feeding each result to the neural net and comparing each resulting forecast to the logged history for the forecasted period.

Maximizing fitness is best effected by minimizing weakness; most of the criteria are best expressed by positive numbers that vary inversely with fitness. An individual's aggregate weakness is a positively-coefficiented linear combination of these criteria, which include (1) the mean number of cache misses per forecast; (2) the number of nonzero parameters; (3) the mean time it takes to forecast the next set of accesses; (4) the mean number, per forecast, of forecast accesses that didn't occur.

The coefficient weights in this combination are parameters of the genetic algorithm. The four specific and the aggregate weakness values are maintained either as integer-pair fractions or extended floating-point. The former's a better choice if one can arrange for the denominator (number of forecasts) of the component weaknesses in the linear combination to be identical when evaluating it, and for the denominators of the aggregate weaknesses to be likewise identical when comparing them. The weights can be simply integers; there's no reason they need to add to one.

Note that the number of cache misses really depends on the state of the cache before the forecast runs. For the purpose of competitive evaluation, in some embodiments we compensate somewhat for this by counting as a miss any access during the forecast period not forecast by the tested individual for that period.

In some embodiments, fitness percentile in this context is in fixed inverse correspondence to rank in the list sorted by weakness, since the total number of slots is constant. A percentile can be maintained using a pointer to the slot with specified rank, the percentile being its weakness value. Untested slots reside together in the desert of maximal weakness. Once tested they either remain there or are moved (deleted and reinserted) to their new position in the sorted list/tree. With each such insertion, the percentile pointer might remain unchanged, might change to point to the slot that was previously its immediate predecessor, or it might point to the newly moved slot.

Failure Criterion and Success/Termination will be discussed next. In one embodiment, an individual fails if no test forecast intersects a logged access for the PID in the forecast's target time interval. It also fails if its weakness is greater than a configurable failure threshold percentile that is a parameter for the genetic algorithm.

In one embodiment, the algorithm is constrained to terminate with failure after executing a configured maximum number of individual tests (excluding hash-match dismissals). It terminates successfully if a configured success threshold weakness percentile is less than a configured success threshold value before reaching said maximum test count.

Although the present invention has been described with respect particular approaches, others can be used. Those skilled in the art will realize that there are numerous ways to implement the form and detail of the present invention that are still within the spirit and scope of the invention.

What is claimed is:

1. A method for prefetching data, comprising:
a forecaster separating address logs into streams based on requesting client process identifiers;
the forecaster selecting a model for each stream;
the forecaster forecasting each stream address according to its respective model; and
a fetcher retrieving pages corresponding to one or more forecasted stream addresses based on their respective models.

2. The method of claim 1, wherein selecting a model includes:
assessing current models, including a first current model, for application to each stream; and
if the first current model is adequate, using the first current model to forecast the stream.

3. The method of claim 1, wherein forecasting includes predicting addresses with a neural network fed by discrete harmonic analysis.

4. The method of claim 3, wherein predicting includes training the neural network with an asynchronous genetic algorithm.

5. The method of claim 1, wherein forecasting includes using a forecasting model to construct a forecast model from time-stamped address access logs.

6. The method of claim 5, wherein the forecasting model is a neural network-based forecasting model optimized to forecast a set of values.

7. The method of claim 6, wherein neuron activations are partitioned and members of the partition are ordered.

8. The method of claim 5, wherein the forecasting model is a neural network-based forecasting model optimized to punish cache misses.

9. An article comprising a nontransitory computer-readable medium having instructions thereon, wherein the instructions, when executed in a computer, create a system for executing a method of soliciting predictions, the method comprising:
a forecaster separating address logs into streams based on requesting client process identifiers;
the forecaster selecting a model for each stream;
the forecaster forecasting each stream address according to its respective model; and
a fetcher retrieving pages corresponding to one or more forecasted stream addresses based on their respective models.

10. The article of claim 9, wherein forecasting includes predicting addresses with a neural network fed by discrete harmonic analysis.

11. The article of claim 10, wherein predicting includes training the neural network with an asynchronous genetic algorithm.

12. A computer system, comprising:
a cache; and
a plurality of processors connected to the cache, wherein the cache includes a prefetch mechanism, wherein the prefetch mechanism includes:
  a forecaster to:
    separate address logs into streams based on requesting client process identifiers;
    select a model for each stream; and
    forecast each stream address according to its respective model; and a fetcher to:
    retrieve pages corresponding to one or more forecasted stream addresses based on their respective models.

13. The system of claim 12, wherein forecasting includes predicting addresses with a neural network fed by discrete harmonic analysis.

14. The system of claim 13, wherein predicting includes training the neural network with an asynchronous genetic algorithm.

* * * * *